United States Patent Office 2,951,863

Patented Sept. 6, 1960

1

2,951,863

PREPARATION OF METHYL ESTER OF METHYL PHOSPHONIC ACID AND ITS CONDENSATION TO PYROMETHYL PHOSPHONIC ACID

Thomas P. Dawson, Bel Air, Md., and Willard E. Catlin, Wilmington, Del., assignors to the United States of America as represented by the Secretary of the Army No Drawing. Filed Aug. 29, 1949, Ser. No. 113,017

5 Claims. (Cl. 260—461)

(Granted under Title 35, U.S. Code (1952), sec. 266)

The invention described herein may be manufactured or used by or for the Government, for governmental purposes, without payment to us of any royalty thereon.

This invention relates to a method for the preparation of the methyl ester of methyl phosphonic acid and of pyro methyl phosphonic acid.

It is an object of this invention to produce the methyl ester of methyl phosphonic acid from a readily available starting material, dimethyl phosphite.

It is a further object to produce pyro methyl phosphonic acid from readily available dimethyl phosphite.

Another object is to provide a process for the rapid isomerization of dimethyl phosphite in the presence of a solvent from which the isomerization product may be readily separated.

Another object is to provide a process for the rapid pyrolysis of dimethyl phosphite to form a product which can be used as an intermediate in the production of useful organic phosphorous compounds.

We have found that the objects of this invention can be realized by rearranging or isomerizing dimethyl phosphites by means of heat to produce the methyl ester of methyl phosphonic acid, which, on further heating, condenses to form pyro methyl phosphonic acid with the elimination of dimethyl ether.

These reactions can be represented by the following equations:

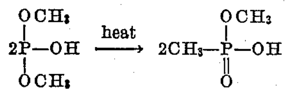

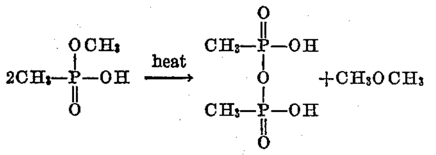

The rearrangement of the dimethyl phosphite into the methyl ester of methyl phosphonic acid can be carried out at about 100° C. The condensation of the methyl ester of methyl phosphonic acid to pyro methyl phosphonic acid commences at about 250–270° C.

Upon investigation of the above reaction, it was found that the isomerization step, even when carried out at the boiling point of dimethyl phosphite (165° C.), required long periods of heating to effect sufficient rearrangement to the methyl ester of methyl phosphonic acid to allow the temperature to be raised to 250° C., where the condensation to pyro methyl phosphonic acid was rapid. Based on methoxyl determinations after 12½ hours of refluxing dimethyl phosphite at 160–165° C., the pyrolysis mixture still contained 57.5% of unchanged dimethyl phosphite.

Attempts to increase the isomerization rate of dimethyl phosphite by employing diphenyl ether (B.P. 253° C.) as

2 a heat transfer medium resulted in no reaction of dimethyl phosphite after a 3-hour heating period. The dimethyl phosphite was separated by distillation from the diphenyl ether unchanged.

Another medium, benzophenone (B.P. 306° C.), was then tried. On addition of dimethyl phosphite, dropwise, to the benzophenone at 280° C., with agitation, a gradual increase of reaction temperature to 295° C. was observed. The reaction mixture was heated for 1 hour at 290°–295° C., after completing the addition of dimethyl phosphite. A homogeneous solution was obtained, from which the benzophenone was then removed by distillation, at 125° C. at 2 mm. pressure. The residue remaining was a hard, glassy, brown solid, which was found to be insoluble in phosphorous trichloride. While the results indicated that a reaction of some type did occur, the end products were not the desired pyromethyl phosphonic acid or the methyl ester of methyl phosphonic acid in a form separable from the solvent benzophenone, in which the end product was soluble.

Since it had been determined that the above reaction media, having the desired physical characteristics, were not operative in the isomerization of dimethyl phosphite, it was surprising, and unexpected, to discover that the reaction could be carried out rapidly and in good yields when a high boiling, heavy paraffin oil (such as Nujol) was employed. The heavy paraffin oil has no specific formula but consists of a mixture of liquid hydrocarbons obtained from petroleum. The boiling range of the oil is between 290° and 400° C., although oils having a boiling point above this temperature may be used. In general, the boiling point of the paraffin oil controls the temperature at which the reaction takes place. It was discovered that reaction temperatures of about 290° to 300° were easily obtained when a high boiling mineral oil, having a boiling point of at least 290° C., was used as the reaction medium. Rearrangement of dimethyl phosphite to methyl ester of methyl phosphonic acid, and conversion of the latter to pyro methyl phosphonic acid, is rapid upon addition of the dimethyl phosphite to the reaction medium at temperatures of about 290° to 300° C. At about 290° C., in the presence of 100 g. of high boiling mineral oil (such as Nujol), 200 g. of dimethyl phosphite was converted to an 88–12 reaction mixture—that is, 88% of pyro methyl phosphonic acid and 12% methyl ester of methyl phosphonic acid—during a 3½-hour reaction period. The pyrolysis product forms a lower layer insoluble in the reaction medium and can readily be separated therefrom.

*Example*

A convenient apparatus for the operation corresponds to a three-necked flask, equipped with a thermometer, reflux condenser, dropping funnel, mercury-sealed mechanical stirrer, and an outlet for escape of gaseous byproducts. A 4 mm. bore stopcock outlet at the bottom of the flask permits removal of the charge at the end of the run.

100 parts, by weight, of a high boiling mineral oil are placed in the flask. The flask and contents are then heated to about 290° to 300° C., with moderate stirring. The apparatus is flushed with nitrogen or carbon dioxide before starting the addition of the dimethyl phosphite, and a slow flow of said gas is maintained during the entire heating period. This eliminates the danger of explosion, and also prevents oxidation of the mineral oil. 200 parts, by weight, of dimethyl phosphite are then added, dropwise, during a 3-hour period, at a temperature of about 290° to 300° C., stirring meanwhile, and heating is maintained for an additional ½ hour to complete the reaction. The temperature is then allowed to drop to about 125° C., and the charge is then drawn off.

The yield is theoretical. Analysis of the product obtained under these conditions indicates it to be a mixture of approximately 88% pyro methyl phosphonic acid, and 12% methyl ester of methyl phosphonic acid. Analytical data by three different methods is as follows:

| | Percent |
|---|---|
| Total phosphorous calculated for 100% pyro compound | 35.58 |
| Total phosphorous found | 34.71 |
| Methoxyl, MeO, found | 3.8 |
| Methyl ester calculated from MeO determination | 13.5 |
| Pyro methyl phosphonic acid by difference | 86.5 |
| Pyro methyl phosphonic acid found by titration method | 88.0 |

It is apparent that certain modifications can be made in the above example without departing from the scope of the present invention. Other non-reactive, high boiling, saturated, aliphatic hydrocarbons may be employed as the reaction medium, and the reaction temperatures may be varied accordingly.

The foregoing example and detailed description have been given for the sake of clarity only and the scope of the invention is not to be construed as limited strictly thereto.

We claim:

1. A method of producing pyromethyl phosphonic acid which comprises refluxing dimethyl phosphite at a temperature of approximately 270° C. in mineral oil having a boiling point in excess of 290° C.

2. A method according to claim 1 in which the refluxing is carried out for a period of time of one-half hour.

3. A method of producing pyromethyl phosphonic acid which comprises refluxing dimethyl phosphite at a temperature of between 290° C. and 300° C. in mineral oil having a boiling point in excess of 290° C.

4. A method of producing pyromethyl phosphonic acid which comprises adding dimethyl phosphite drop-wise to mineral oil having a boiling point in excess of 290° C. and which is at a temperature of between 290° C. and 300° C. and refluxing the mixture for approximately one-half hour after the drop-wise addition of dimethyl phosphite has been completed.

5. A method according to claim 4 in which approximately 200 parts by weight of the dimethyl phosphite are added drop-wise to the mineral oil over approximately a three hour period.

References Cited in the file of this patent

UNITED STATES PATENTS 2,384,945 Marisic ---------------- Sept. 18, 1945

OTHER REFERENCES

Schrader: British Intelligence Objectives Report B.I.O.S., No. 1808, Item 22, pp. 19 and 20, released October 4, 1948.